(12) United States Patent
Brunner et al.

(10) Patent No.: US 10,106,382 B2
(45) Date of Patent: Oct. 23, 2018

(54) CHAMBER CONVEYOR BELT MACHINE

(71) Applicant: MULTIVAC Sepp Haggenmüller SE & Co. KG, Wolfertschwenden (DE)

(72) Inventors: Maximilian Brunner, Kempten (DE); Rainer Häring, Lauben (DE); Konrad Mössnang, Kempten (DE)

(73) Assignee: MULTIVAC SEPP HAGGENMÜLLER SE & CO. KG, Wolfertschwenden (DE)

(*) Notice: Subject to any disclaimer, the term of this patent is extended or adjusted under 35 U.S.C. 154(b) by 0 days.

(21) Appl. No.: 15/583,858

(22) Filed: May 1, 2017

(65) Prior Publication Data

US 2017/0320714 A1   Nov. 9, 2017

(30) Foreign Application Priority Data

May 3, 2016  (EP) .................... 16168027

(51) Int. Cl.
| | | |
|---|---|---|
| *B66F 3/30* | (2006.01) | |
| *B65B 57/00* | (2006.01) | |
| *B65G 15/00* | (2006.01) | |
| *B66F 3/24* | (2006.01) | |
| *B65B 31/02* | (2006.01) | |
| *B65B 51/14* | (2006.01) | |

(52) U.S. Cl.
CPC ............... *B66F 3/30* (2013.01); *B65B 31/02* (2013.01); *B65B 51/14* (2013.01); *B65B 57/005* (2013.01); *B65G 15/00* (2013.01); *B66F 3/247* (2013.01); *B65G 2812/02108* (2013.01)

(58) Field of Classification Search
CPC .. B65G 2812/02108; B65B 31/02; B66F 3/30
See application file for complete search history.

(56) References Cited

U.S. PATENT DOCUMENTS

| | | | | |
|---|---|---|---|---|
| 3,724,641 | A * | 4/1973 | Wainwright | B65G 43/00 198/395 |
| 3,818,574 | A * | 6/1974 | Reid | B65B 31/024 29/243.56 |
| 4,054,018 | A * | 10/1977 | Neukom | B65B 1/12 141/257 |
| 4,134,501 | A | 1/1979 | Tune | |
| 4,425,868 | A * | 1/1984 | Shapiro | C03C 17/005 118/314 |
| 4,985,059 | A * | 1/1991 | Letemps | C03B 23/0254 198/394 |

(Continued)

FOREIGN PATENT DOCUMENTS

| | | |
|---|---|---|
| DE | 102010013889 A1 | 10/2011 |
| EP | 2492236 A1 | 8/2012 |

*Primary Examiner* — Thomas Randazzo
(74) *Attorney, Agent, or Firm* — Husch Blackwell LLP

(57) ABSTRACT

A chamber conveyor belt machine having a machine frame, a chamber cover with two or more columns and a lifting device for lifting the chamber cover. The lifting device may include a safety system that includes a latching rail that cooperates with a latching hook disposed on at least one of the two columns. The safety system may include one or more sensors for determining whether the lifting device is working correctly or is in a failure condition. The safety system may prevent the chamber conveyor belt machine from operating if a failure condition is sensed.

13 Claims, 3 Drawing Sheets

(56) References Cited

U.S. PATENT DOCUMENTS

| | | | | |
|---|---|---|---|---|
| 5,028,250 | A * | 7/1991 | Deb | C03B 29/08 |
| | | | | 65/256 |
| 7,455,629 | B2 * | 11/2008 | Abelbeck | A63B 21/078 |
| | | | | 482/101 |
| 7,562,511 | B2 * | 7/2009 | Buchko | B65B 31/022 |
| | | | | 53/434 |
| 8,003,032 | B2 * | 8/2011 | Al-Sabih | B28B 11/12 |
| | | | | 264/157 |
| 9,032,695 | B2 * | 5/2015 | Haring | B65B 31/024 |
| | | | | 53/393 |
| 9,145,283 | B2 * | 9/2015 | Oehm | B23Q 5/385 |
| 9,580,946 | B2 * | 2/2017 | Schinkowsky | E05C 19/12 |
| 9,784,782 | B2 * | 10/2017 | Friedl | E05F 15/60 |
| 2006/0252609 | A1 | 11/2006 | Abelbeck | |
| 2010/0199703 | A1 * | 8/2010 | Ziegler | A23L 3/361 |
| | | | | 62/380 |
| 2016/0114920 | A1 * | 4/2016 | Mo nang | B65B 31/024 |
| | | | | 53/403 |

* cited by examiner

CHAMBER CONVEYOR BELT MACHINE

CROSS-REFERENCE TO RELATED APPLICATIONS

This application claims priority to European Patent Application Number 16168027.7 filed May 3, 2016, to Maximilian Brunner, Rainer Häring, and Konrad Mössnang, currently pending, the entire disclosure of which is incorporated herein by reference.

FIELD OF THE INVENTION

The invention relates to a packaging machine in the form of a chamber conveyor belt machine.

BACKGROUND OF THE INVENTION

The German patent no. DE 102010013889 A1 shows a chamber conveyor belt machine having a unit for vertically moving a chamber cover. In this machine, the chamber cover is arranged at four columns, which are synchronously moved by means of a motor drive and a fluid cylinder as a supporting tool.

SUMMARY OF THE INVENTION

It is an object of the invention to constructively simplify a chamber conveyor belt machine regarding the movement of the chamber cover.

The chamber conveyor belt machine of the invention comprises a machine frame, a chamber cover with two columns, and a lifting device, wherein a safety system may be provided for the lifting device. The conveyor belt machine according to the invention is characterized in that the safety system may comprises a latching rail cooperating with a latching hook at one column in order to secure the chamber cover in a lifted position against lowering or falling down in the event that the lifting device shows a malfunction, for example, due to the fact that a failure of the pressurized air supply of the pneumatic cylinder for lifting the chamber cover, an inner leakage in the pneumatic cylinder, or a leakage in the supply lines may be provided. In this case, nevertheless, a secure hold of the chamber cover may be provided and any danger to the operating personnel is prevented.

In a preferred embodiment, the latching rail may comprise a plurality of latching teeth, in order to generate a self-reinforcing holding effect of the chamber cover together with the latching hook of the column.

Preferably, the latching rail at its first end may be arranged so as to be pivotable on the machine frame, and at its second end, an actuator may be provided in order to pivot the latching rail about the first end and to guide the latching rail to the column or the latching hook so that the latching hook engages one of the latching teeth and a lowering of the chamber cover is prevented.

The actuator may be a pneumatic cylinder or a motorized linear drive in order to enable a simple performance of the construction.

The safety system may have at least one first sensor in order to screen the holding position, in which the latching hook engages the latching rail in order to ensure the highest security against the risk of an unintentionally or unexpectedly lowering of the chamber cover.

Thereby, the sensor preferably verifies the position of the latching rail or may alternatively be arranged on the actuator in order, for example, to check the position of a cylinder piston or a linear carriage.

In a preferred embodiment, a second sensor may be provided in order to also verify the open position of the latching rail. Thus, the function of a positively-driven resetting from an open position into the holding position can also be checked, since both positions can be detected via the two sensors.

The safety system preferably has a spring in order to move the latching rail into the holding position so that an automatic resetting of the latching rail into the holding position is provided in a constructively preferred manner.

The spring may be preferably a resetting spring within a pneumatic cylinder.

A method according to the invention for operating a chamber conveyor belt machine as described above is characterized in that a functional test may be carried out before a machine start, wherein the chamber cover is extended into its uppermost position, the safety system is in the open position, and wherein the first sensor verifies the open position. Thus, in conjunction with valves, pressure switches, and unlockable throttling back valves, for example, a performance level "d" according to technical standard EN ISO 13849-1 can be achieved.

Thereby, in one embodiment, the first sensor preferably screens the position of the pneumatic cylinder by means of the piston position in order to determine the position of the latching rail.

In the event of a failure, the chamber conveyor belt machine may preferably indicates an error message by means of a control system and the chamber belt machine does not enter into an operation mode, since the safety is no longer ensured. The failure has to be remedied before the chamber conveyor belt machine can be further operated.

Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to the following drawings, in which the individual figures show.

DETAILED DESCRIPTION OF THE INVENTION

Figure 1:
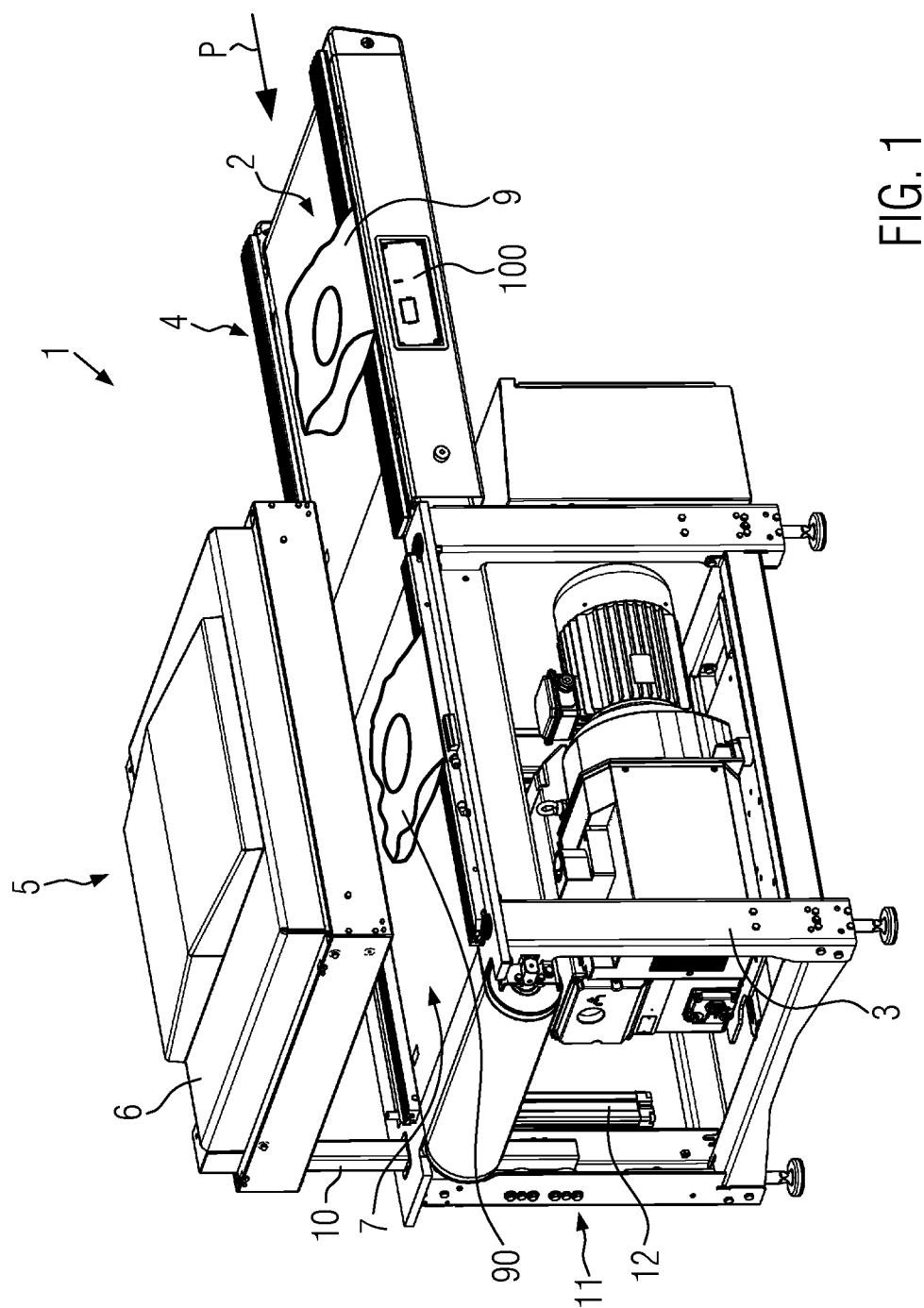
FIG. 1 is a perspective view of one embodiment of a chamber conveyor belt machine in accordance with the teachings of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a schematic view of a chamber conveyor belt machine 1 according to the invention comprising a conveyor belt 2, a machine frame 3, a loading area 4, and an evacuating and sealing device 5. The evacuating and sealing device 5 has a vertically movable chamber cover 6, which together with a lower part 7 forms a chamber that can be evacuated. The chamber cover 6 can be automatically closed and opened by means of a power-driven mechanism in order, for example, to collect bags 9 to be evacuated and sealed, which are automatically fed to the evacuating and sealing device 5 by the motor-driven conveyor belt in a production direction P. The bag 9 with its product is evacuated in the chamber and subsequently air-tightly sealed in the region of its bag opening so that a vacuum pack 90 is produced.

The chamber conveyor belt machine 1 comprises a lifting device 11, wherein the chamber cover 6 can be lifted and lowered vertically via two columns 10 by means of one pneumatic cylinder 12, respectively. Via a control 100, which is arranged in the loading area 4, an operator can carry out settings and the machine start and receives display status reports, for example error messages.

Figure 2:
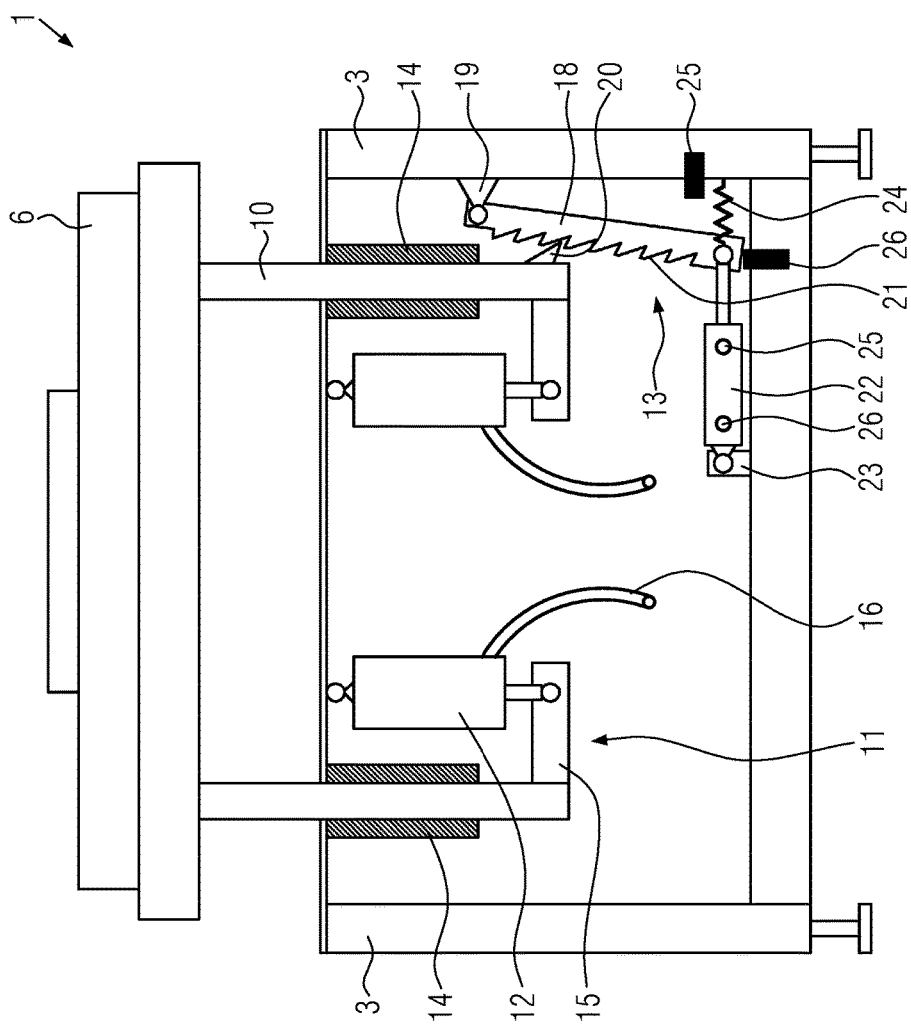
FIG. 2 is a schematic rear view of one embodiment of a chamber conveyor belt machine in accordance with the present invention with a safety system in the holding position.

FIG. 2 shows a schematic rear view of the chamber conveyor belt machine 1 comprising a safety system 13 for the lifting device 11 in the holding position. The two columns 10 are guided via guides 14, which are connected to the machine frame, and are each movable via a pneumatic cylinder 12. The pneumatic cylinder 12 is connected to a lower end of the movable column 10 via a bar 15. The pneumatic cylinders 12 themselves are supplied via at least one compressed air line 16. In the event that, for example, a leakage occurs along the compressed air line 16, a leakage in the interior of the pneumatic cylinder 12, or a failure of the compressed air supply for the pneumatic cylinders 12, a safety system 13 is provided in order to prevent the chamber cover 6 from being lowered unexpectedly for the machine operator. The safety system 13 comprises a latching rail 18, which is rotatably or pivotably mounted via a support 19 to the machine frame 3 and cooperates with a latching hook 20, which is mounted on the right-hand column 10 in the lower area shown in FIG. 2.

On its side facing the column 10, the latching rail 18 has a plurality of latching teeth 21, between which the latching hook 20 can immerse, if the latching rail 18 is in its holding position, as shown in FIG. 2. The shape of the latching teeth 21 and the latching hook 20 is designed such that when brought into contact with one another, the weight of the chamber cover 6 even reinforces a latching of the latching hook 20 with the latching teeth 21.

The pivoting movement of the latching rail 18 occurs, for example, by means of an actuator 22, shown here as a pneumatic adjust cylinder 22, which on the one hand is connected to a lower end of the latching rail 18, and on the other hand to the machine frame 3 via a further support 23. A pressure spring 24, which is supported on the machine frame 3 and pivots the latching rail 18 into the holding position so that the latching teeth approach the latching hook 20 and also come into contact, ensures a forced movement of the latching rail into the holding position, even in the event of a failure of the adjust cylinder 22. Instead of the pressure spring 24, also a spring-resetting pneumatic cylinder is conceivable as an actuator 22.

Figure 3:
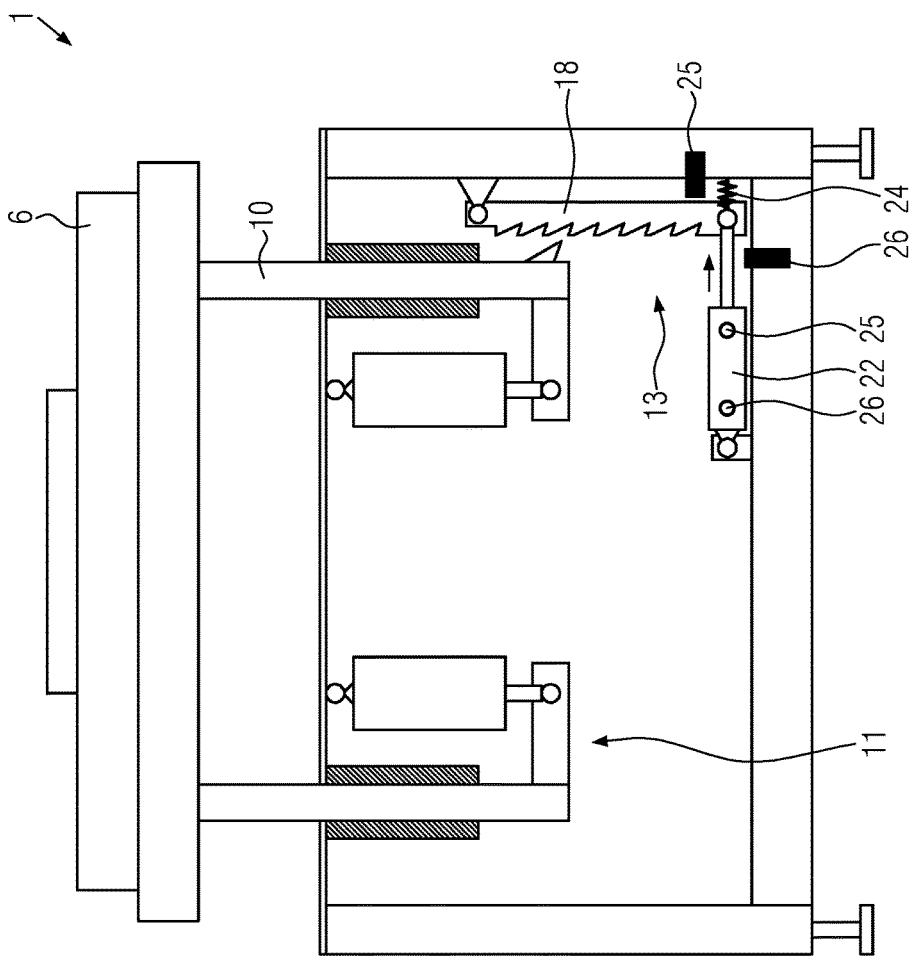
FIG. 3 is a schematic rear view of one embodiment of a chamber conveyor belt machine in accordance with the present invention with a safety system in the open position.

FIG. 3 shows a schematic rear view similar to FIG. 2 of the chamber conveyor belt machine 1 with the safety system 13 in the open position, in which the latching rail 18 has been moved counterclockwise away from the latching hook 20. This pivoting movement is effected by the actuator 22 in the direction of the arrow. Thereby, the illustrated pressure spring 24 or the resetting spring, which is not shown in more detail, is compressed and tensioned in the interior of the actuator 22 or of the pneumatic adjust cylinder. In this open position, namely the cleaning position, the chamber cover 6 can be moved by means of the lifting device 11 at least into an upper charging position or into a lower evacuating and sealing position, namely the working position.

The operation of the chamber conveyor belt machine 1 provides a functional test of the safety system 13 and, in particular, of the pressure spring 24 before each start, after each switching on of the chamber conveyor belt machine 1 or in cyclic sections. The chamber cover 6 is lifted to its uppermost position via the control 100, while the safety system 13 is in the open position. Subsequently, the safety system 13 is brought into the holding position. In order to be able to monitor one or both positions, a first sensor 25 is provided, which detects the open position. Optionally, a second sensor 26 can also be provided in order to also detect the holding position. Thus, both positions and also the change between both positions can be reliably detected by the control 100. In an alternative embodiment, two sensors 25, 26 can also be arranged on the actuator 22 in order to detect both positions at the actuator 22.

If the control 100 determines an error in this function test or also during the operation of the chamber conveyor belt machine 1, the chamber conveyor belt machine 1 is stopped and a corresponding message is issued, by means of which the machine operator can carry out an elimination of the problem.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A chamber conveyor belt machine comprising:
    a machine frame;
    a chamber cover with two columns;
    a lifting device for lifting the chamber cover, the lifting device having a safety system, wherein the safety system includes a latching rail that cooperates with a latching hook disposed on at least one of the two columns; and
    wherein the latching rail has an open position and a holding position;
    wherein the safety system includes a first sensor to verify the latching rail is in the open position.

2. The chamber conveyor belt machine according to claim 1, wherein the latching rail has a plurality of latching teeth.

3. The chamber conveyor belt machine according to claim 1, wherein the latching rail has a first end and a second end, and the first end is pivotably connected to the machine frame and the second end is operably connected to an actuator to pivot the latching rail about the first end.

4. The chamber conveyor belt machine according to claim 3, wherein the actuator is one of a pneumatic cylinder or a motorized linear drive.

5. The chamber conveyor belt machine according to claim 1, wherein the first sensor verifies the position of the latching rail.

6. The chamber conveyor belt machine according to claim 1, wherein the first sensor is disposed on the actuator to measure the position of one of a cylinder piston or a linear carriage.

7. The chamber conveyor belt machine according to claim 1, further comprising a second sensor to screen the holding position, wherein the latching hook engages the latching rail in the holding position.

8. The chamber conveyor belt machine according to claim 1, wherein the safety system has a spring configured to pretension the latching rail in the holding position.

9. The chamber conveyor belt machine according to claim 8, wherein the spring is a resetting spring operably connected to a pneumatic cylinder.

10. A method for operating a chamber conveyor belt machine, the method comprising:
    carrying out a functional test prior to a machine start of the chamber conveyor belt machine;
    wherein carrying out the functional test step comprises extending a chamber cover into its uppermost position, disposing a safety system in an open position, and verifying the safety system is in the open position using a first sensor.

11. The method according to claim 10, further comprising verifying the position of a pneumatic cylinder using a first sensor to sense a position of a piston.

12. The method according to claim 11, further comprising:
    displaying an error message using a control system in the event the first sensor measures a failure condition, wherein a failure condition comprises at least one of a failure of a pressurized air supply of the pneumatic cylinder for lifting the chamber cover, an inner leakage in the pneumatic cylinder, or a leakage in supply lines to the pneumatic cylinder; and
    preventing the chamber conveyor belt machine from entering into an operation mode if the first sensor detects the failure condition.

13. A chamber conveyor belt machine comprising:
    a machine frame;
    a chamber cover operably coupled with two columns, said chamber cover and said two columns are moveable between a lifted position and a working position; and
    a lifting device for lifting the two columns and the chamber cover together, the lifting device having a safety system, wherein the safety system includes a latching hook disposed on at least one of the two columns and a latching rail that cooperates with said latching hook to selectively secure the chamber cover in the lifted position.

* * * * *